United States Patent
Bückmann et al.

(10) Patent No.: US 9,512,322 B2
(45) Date of Patent: Dec. 6, 2016

(54) RADIATION CURABLE LIQUID COMPOSITION FOR LOW GLOSS COATINGS

(75) Inventors: Alfred Jean Paul Bückmann, Waalwijk (NL); Danny Visser, Waalwijk (NL); Johannes Jacobus Julius Van Den Biggelaar, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 358 days.

(21) Appl. No.: 13/578,040

(22) PCT Filed: Feb. 10, 2011

(86) PCT No.: PCT/EP2011/051944
§ 371 (c)(1),
(2), (4) Date: Nov. 26, 2012

(87) PCT Pub. No.: WO2011/098514
PCT Pub. Date: Aug. 18, 2011

(65) Prior Publication Data
US 2013/0131268 A1    May 23, 2013

(30) Foreign Application Priority Data

Feb. 11, 2010   (EP) .................................. 10153265

(51) Int. Cl.
| | | |
|---|---|---|
| *C09D 175/16* | (2006.01) | |
| *C09D 4/00* | (2006.01) | |
| *C09D 151/00* | (2006.01) | |
| *C09D 7/12* | (2006.01) | |
| *C09D 167/07* | (2006.01) | |
| *C09D 175/14* | (2006.01) | |
| *C08L 33/04* | (2006.01) | |
| *C08L 75/16* | (2006.01) | |

(52) U.S. Cl.
CPC ............. *C09D 4/00* (2013.01); *C09D 151/003* (2013.01); *C08L 33/04* (2013.01); *C08L 75/16* (2013.01); *C09D 7/125* (2013.01); *C09D 167/07* (2013.01); *C09D 175/14* (2013.01); *C09D 175/16* (2013.01)

(58) Field of Classification Search
CPC ..... C09D 175/16; C09D 175/14; C09D 7/125; C09D 167/07
USPC ........................................................ 524/850
See application file for complete search history.

(56) References Cited

U.S. PATENT DOCUMENTS

| | | | | |
|---|---|---|---|---|
| 5,091,053 | A | * | 2/1992 | Blonder et al. .................. 216/24 |
| 5,448,672 | A | * | 9/1995 | Blonder et al. ................. 385/123 |
| 5,881,194 | A | * | 3/1999 | Duecker ........................ 385/115 |
| 2002/0176677 | A1 | * | 11/2002 | Kumar et al. ................. 385/126 |
| 2008/0138531 | A1 | * | 6/2008 | Laginess et al. ............. 427/508 |
| 2008/0257216 | A1 | * | 10/2008 | Ravyst ...................... 106/287.26 |
| 2008/0274361 | A1 | * | 11/2008 | Casteren Van et al. ... 428/425.1 |
| 2010/0056662 | A1 | * | 3/2010 | Spyrou et al. .................. 522/96 |
| 2010/0310882 | A1 | * | 12/2010 | Ogawa et al. ............. 428/423.4 |
| 2013/0131268 | A1 | * | 5/2013 | Buckmann et al. .......... 524/850 |

FOREIGN PATENT DOCUMENTS

| | | |
|---|---|---|
| WO | WO 2005/019128 | 3/2005 |
| WO | WO 2009/037345 | 3/2009 |

OTHER PUBLICATIONS

International Search Report for PCT/EP2011/051944, mailed Jul. 15, 2011.
Written Opinion for PCT/EP2011/051944, mailed Jul. 15, 2011.

* cited by examiner

*Primary Examiner* — Michael A Salvitti
(74) *Attorney, Agent, or Firm* — Nixon & Vanderhye P.C.

(57) ABSTRACT

A radiation curable liquid coating composition comprising 1 to 90 wt % of at least one multifunctional (meth)acrylated oligomer; 10 to 80 wt % of at least one $C_8$ to $C_{20}$ monofunctional aliphatic alkyl (meth)acrylate; 0 to 40 wt % of at least one monomeric reactive diluent wherein (a)+(b)+(c)= 100%; and additionally comprising 0.1 to 15 wt % of matting agent by weight of the coating composition.

16 Claims, No Drawings

RADIATION CURABLE LIQUID COMPOSITION FOR LOW GLOSS COATINGS

This application is the U.S. national phase of International Application No. PCT/EP2011/051944 filed 10 Feb. 2011 which designated the U.S. and claims priority to EP Patent Application No. 10153265.3 filed 10 Feb. 2010, the entire contents of each of which are hereby incorporated by reference.

The present invention relates to a radiation curable coating composition resulting in very matt (low gloss) coatings upon drying, a process for preparing such a composition and a coating obtained from such a composition.

Radiation curable coating compositions have long been used to produce coatings having desired coating characteristics. For example coating compositions are used to protect surfaces from the environment, to conceal surface irregularities, to provide a surface which is more receptive to further treatment, or to enhance the surface appearance, such as providing a high gloss or low gloss (i.e. matt) surface.

US2008/0138531 A1 discloses a UV radiation curable primer coating composition with an improved curing time and includes ethylenically unsaturated free radically polymerisable compounds and 0.1% photoinitiator or less. As this is a primer composition the relative gloss is not relevant.

WO2005/019128 A2 discloses a radiation curable liquid composition comprising a urethane (meth)acrylate oligomer and a monomer such as 2-vinyloxyethyl (meth)acrylate or 2-hydroxyethyl (meth)acrylate. The use of such resin compositions is for the coating of optical fibres where increasing the cure speed and a reduction in yellowing is considered important.

DE102006045041 A1 discloses a radiation curable composition comprising for example polyurethane (meth)acrylates and monofunctional reactive diluents to provide flexible coatings with improved corrosion resistances for metallic substrates.

EP0407004 A2 discloses a radiation curable composition for affixing coated and inked optical fibres in a ribbon configuration. Here the adhesive properties are of value.

None of these disclosures are concerned with the preparation of low gloss coatings. Gloss is associated with the capacity of a surface to reflect more light in some directions than in others. High gloss surfaces reflect a high proportion of light directed at them and low gloss surfaces reflect a low proportion of light directed at them. The directions associated with mirror (or specular) reflection normally have the highest reflectance. Measurements by such a test method (as described for example in DIN-67530) correlate with visual observations of surface shininess made at the corresponding angles.

Low gloss coatings that produce less image impairment are often more pleasing aesthetically.

Normally 100% radiation curable resin compositions are very difficult to matt. There is a big demand for very low gloss coatings, both in the wood (furniture, parquet, kitchens, construction) industry, as well as in the plastics, metal and concrete (consumer electronics, automotive, construction) industry and in the graphic arts (printing inks, over print varnish (OPV)) industry. With conventional technologies such as solvent borne or water borne resin compositions a low gloss coating can be fairly easily achieved by the addition of relatively small amounts of matting agents (for example 1 to 5 wt % silicas). In 100% radiation curable resin compositions regularly more than 15 wt % and even up to 25 wt % matting agent is required to achieve low gloss and even then low gloss values such as below 15 at 60° cannot be achieved. To obtain for example low gloss in clear coats from UV curable compositions, typically more than 15 wt % of matting agent based on the weight of the coating composition has to be added. Also the resin composition increases dramatically in viscosity when such high levels of matting agents need to be used. Very high viscosities may be detrimental for obtaining good flow when coating a substrate.

Traditionally low gloss coating compositions are obtained by the addition of matting agents such as silicone dioxide and micronized organic polymer wax. Matting agents are well known in the art and traditionally comprise materials ground into minute particles of irregular shape which are used in compositions such as paints and varnishes to disperse incident light rays so that a low gloss effect is achieved. Standard matting agents include for example silica (for example amorphous silicon dioxide), diatomaceous earth, heavy metal soaps, talcum and chalk.

The disadvantages resulting from the addition of high levels of standard matting agents in 100% radiation curable compositions to reduce gloss include coagulation of the composition resulting in a seedy appearance; increased brittleness of the resultant coating; settling out of the matting agents often resulting in inconsistent mixing before application resulting in variation in gloss throughout the coating; as well as reducing the general resistance and performance properties of the coating. The change in appearance may be measured as a change in the gloss level of a coating.

It has been found that the efficiency of matting agents in 100% radiation curable compositions may be increased by the addition of at least one $C_8$ to $C_{20}$ monofunctional aliphatic alkyl (meth)acrylate thus allowing a reduction in the amount needed. Furthermore the overall balance of properties may be maintained, such as for example ease of coating, a good cure speed, good hardness, flexibility and chemical resistance.

According to the present invention there is provided a radiation curable liquid coating composition comprising:
(a) 1 to 90 wt % of at least one multifunctional (meth) acrylated oligomer selected from the group consisting of polyester (meth)acrylate, urethane (meth)acrylate, epoxy (meth)acrylate, polyether (meth)acrylates, amine modified polyether(meth)acrylates, acrylic (meth)acrylates and mixtures thereof;
(b) 10 to 80 wt % of at least one $C_8$ to $C_{20}$ monofunctional aliphatic alkyl (meth)acrylate;
(c) 0 to 40 wt % of at least one monomeric reactive diluent not comprising (a) or (b);
wherein (a)+(b)+(c)=100%;
the coating composition additionally comprising 0.1 to 15 wt % of matting agent by weight of the coating composition.

All ranges of amounts are intended to include each and every point within the range.

The present invention provides a coating composition curable under natural outdoor light or by ultraviolet (UV) lamp radiation. The components carry ethylenically unsaturated bond functionality capable of crosslinking which is susceptible to initiation by radiation. It is especially preferred that this radiation is UV radiation. Radiation initiated crosslinking may be carried out with or without added photoinitiator. The coating dries quickly, is sandable as well as having chemical resistance.

Preferably the C═C bond concentration of the composition is in the range of from 0.25 to 7 mmol/g, more preferably 1 to 6 mmol/g and most preferably 2 to 5 mmol/g of components (a)+(b)+(c).

Gloss measurements are made with 85° or 60° geometry of angles and apertures. The thickness of the coating may affect the gloss measurement and the values herein, unless stated otherwise, are measured at a cured film thickness of 12 μm.

Preferably the 85° gloss of the matt composition of the invention upon curing is ≤80, most preferably ≤60, especially ≤50, more especially ≤45, and most especially ≤40.

Preferably the 60° gloss of the matt composition of the invention upon curing is <15, more preferably ≤10, most preferably ≤8, especially ≤7 and most especially ≤5.

Component (a) carries ethylenically unsaturated bond functionality capable of crosslinking. The functionality is generally between two and six and preferably between two and three. Generally, the lower the functionality, the lower the reactivity, the lower the viscosity and the higher the flexibility. Higher functionalities may improve reactivity, scratch resistance and chemical resistance.

Component (a) is at least a multifunctional (meth)acrylated oligomer selected from the group consisting of polyester (meth)acrylate, urethane (meth)acrylate, epoxy (meth)acrylate, polyether (meth)acrylates, amine modified polyether(meth)acrylates, acrylic (meth)acrylates and mixtures thereof. Component (a) may be branched or linear.

Preferably the (meth)acrylated oligomer (a) is present in an amount from 1 to 90 wt %, more preferably 5 to 80 wt %, still more preferably 10 to 66 wt % and most preferably 10 to 49 wt % by weight of components (a)+(b)+(c). Preferably the (meth)acrylated oligomer (a) has a viscosity ≤50 Pa·s.

Preferably the (meth)acrylated oligomer (a) has a $Mn \geq 300$ g/mol and more preferably ≥500 g/mol. Preferably the (meth)acrylated oligomer (a) has a $Mn \leq 10,000$ g/mol and more preferably ≤9,000 g/mol.

Preferably the C═C bond concentration of the (meth)acrylated oligomer (a) is in the range of from 0.5 to 3 mmol/g and more preferably 1 to 2 mmol/g of (a).

Urethane (meth)acrylates (a) are those products formed by the reaction of an isocyanate containing component with a hydroxyl containing component. At least one of these components must contain ethylenic unsaturation. Examples of isocyanate functional components are hexamethylene diisocyanate, isophorone diisocyanate, isocyanate functional acrylic polymers and polyurethanes, reaction products of hydroxyl functional components (e.g. polyethylene glycol, polypropylene glycol and di-, tri- and etc-hydroxy aliphatic alcohols (e.g. glycerol and trimethylolpropane) and their ethoxylated, propoxylated and polycaprolactone analogs) with di-, tri- and etc-isocyanates (e.g. hexamethylene diisocyanate, isophorone diisocyanate and toluene diisocyanate). Examples of hydroxy containing ethylenically unsaturated components are hydroxyethyl (meth)acrylate and its ethoxylated, propoxylated and polycaprolactone analogs as well as (meth)acrylated polyester polyols and (meth)acrylated polyether polyols.

Examples of urethane (meth)acrylates (a) include NeoRad™ U-25-20D, NeoRad™ U-60, NeoRad™ U-70, NeoRad™ U-10-15H and NeoRad™ U-20-12H available from DSM NeoResins BV. NeoRad™ is a registered trademark of DSM.

Preferred urethane (meth)acrylates (a) have a number average molecular weight in the average range of from 300 to 10,000 g/mol, more preferably 400 to 5,000 g/mol and most preferably 500 to 2,000 g/mol.

Number average molecular weights, especially of lower molecular weights, may be determined by Gel Permeation Chromatography using polystyrene as a standard and tetrahydrofuran or hexafluoroisopropanol (HFIP), as appropriate, as an eluent.

Epoxy (meth)acrylates (a) are derived from epoxy resins and in most cases do not have any free epoxy groups left. Epoxy (meth)acrylates are products formed by the reaction of (meth)acrylic acid with an epoxy(glycidyl) functional component e.g. aliphatic and aromatic containing epoxy resins, epoxidised oils, acrylic polymers and acrylic grafted polymers in which the acrylic component contains pendent epoxy groups. Some of the (meth)acrylic acid may be replaced by other acids, both ethylenically unsaturated and saturated, so as to impart specific properties e.g. aliphatic acids, fatty acids and aromatic acids. These products may alternatively be prepared by the reaction of a carboxylic acid functional component (e.g. polyesters and acrylic polymers) with a second component containing both epoxy groups and ethylenic unsaturation e.g. glycidyl (meth)acrylate.

Preferred epoxy (meth)acrylates (a) have a number average molecular weight in the average range of from 300 to 10,000 g/mol, more preferably 400 to 5,000 g/mol and most preferably 500 to 2,000 g/mol.

Examples of epoxy (meth)acrylates (a) include NeoRad™ E-10, NeoRad™ E-10-20T, NeoRad™ E-20 and NeoRad™ E-30 available from DSM NeoResins BV.

Polyester(meth)acrylates (a) are derived from polyols and polyacids and acrylic acid or a hydroxyacrylate to make the oligomer acrylate functional. Preferred polyols include for example trimethylol propane, ethoxylated trimethylol propane, neo pentyl glycol, glycerol, propoxylated glycerol, ethylene glycol, propylene glycol, pentaerythritol, polypropylene glycol and diethyleneglycol. Preferred polyacids include for example diacids, adipic acid, methylenesuccinic acid (itaconic acid), succinic acid, (iso)phtalic acid, terephtalic acid, cyclohexanedicarboxylic acid or the corresponding anhydrides. Acrylate functional and monofunctional acids or alcohols such as acrylic acid, 2-carboxyethyl acrylate (β-CEA), hydroxyethyl (meth)acrylate may be used as chain stoppers to make the polyester acrylate functional. Also included as building blocks are: difatty acids, difatty alcohols and polyamides. A further route includes reacting an acrylate functionality with a primary or secondary amine via Michael addition to obtain a polyester or polyether amine acrylates.

Examples of polyester(meth)acrylates (a) include NeoRad™ P-10, NeoRad™ P-20, NeoRad™ P-30, NeoRad™ P-40, NeoRad™ P-60, NeoRad™ P-61, NeoRad™ P-90 and amine modified polyether acrylates such as NeoRad™ P-80, NeoRad™ P-81 and NeoRad™ P-85 all available from DSM NeoResins BV.

Component (b), the at least one $C_8$ to $C_{20}$ monofunctional aliphatic alkyl (meth)acrylate, carries ethylenically unsaturated bond functionality capable of crosslinking. Component (b) may be branched or linear. Component (b) may comprise mixtures of $C_8$ to $C_{20}$ monofunctional aliphatic alkyl (meth)acrylates.

Preferably component (b) is present in an amount from 10 to 80 wt. %, for example from 15 to 70 wt %, more preferably 10 to 60 wt %, still more preferably 20 to 60 wt % and most preferably 30 to 45 wt % by weight of components (a)+(b)+(c).

Preferably component (b) comprises at least one $C_9$ to $C_{20}$ and even more preferably at least one $C_{10}$ to $C_{20}$ monofunctional aliphatic alkyl (meth)acrylate as it may be that higher alkyl groups result in a reduction in reduced odour of the radiation curable liquid coating composition.

Examples of component (b) are alkyl esters of (meth) acrylic acid such as isodecyl (meth)acrylate, lauryl (meth) acrylate, octyl (meth)acrylate, decyl (meth)acrylate, stearyl (meth)acrylate and mixtures thereof. Preferably component (b) is selected from the group consisting of octyl (meth) acrylate, decyl (meth)acrylate, lauryl (meth)acrylate, stearyl (meth)acrylate and mixtures thereof.

Preferably component (b) has a Mn≤450 g/mol. Preferably the C=C bond concentration of component (b) is in the range of from 4 to 6 mmol/g of (b).

Preferably component (c), the monomeric reactive diluent, is present in an amount from 0 to 40 wt %, for example from 1 to 40 wt %, more preferably 5 to 40 wt %, still more preferably 5 to 30 wt % and most preferably 10 to 25 wt % by weight of components (a)+(b)+(c).

Component (c) carries ethylenically unsaturated bond functionality capable of crosslinking. The functionality is generally between one and six and preferably ≥two and more preferably ≥three.

Component (c) includes for example multifunctional (meth)acrylate monomers such as (meth)acrylic acid esters of mono-, di- and tri-hydroxyl alcohols (e.g. polyethylene glycol, polypropylene glycol, aliphatic diols, ethylene glycol, neopentyl glycol, ethoxylated bisphenol A, trimethylolpropane, di-trimethylolpropane, pentaerythritol, dipentaerythritol, glycerol, propoxylated glycerol, and all other ethoxylated and propoxylated monomers; 2-phenoxy ethylacrylate (PEA), glycerol propoxylate triacrylate (GPTA), neopentyl glycol di(meth)acrylate, trimethylolpropane tri(meth)acrylate (TMPTA), ethoxylated trimethylolpropane tri(meth)acrylate (TMPTA3EO, TMPTA6EO), pentaerythritol tri(meth)acrylate and tetra(meth)acrylate, caprolactone (meth)acrylates, alkoxylated (meth)acrylates, glycerol (meth)acrylates, 1,4-butanediol di(meth)acrylate, 1,6-hexane diol di(meth)acrylate (HDDA), ethoxylated 1,6-hexane diol di(meth)acrylate (HDDA2EO), 2,2-dimethyl-3-hydroxypropyl-2,2-dimethyl-3-hydroxypropionate di(meth) acrylate, isobornyl (meth)acrylate, dipropylene glycol diacrylate (DPGDA), tripropylene glycol di(meth)acrylate (TPGDA) and the like.

Preferably component (c) is selected from the group consisting of trimethylolpropane tri(meth)acrylate (TMPTA), pentaerythritol acrylate (PETA), 1,6-hexane diol diacrylate (HDDA), neopentyl glycol di(meth)acrylate (NPGDA), glycerol propoxylate triacrylate (GPTA), ethoxylated trimethylolpropane tri(meth)acrylate (TMPTA3EO, TMPTA6EO), and mixtures thereof.

Preferably component (c) is a mono- or polyfunctional reactive diluent with a low viscosity and a high reactivity. Preferably the viscosity of component (c) is in the range of from 50 mPa·s to 2 Pa·s and most preferably <500 mPa·s.

Preferably component (c) has a number average molecular weight in the average range of from 100 to 1000 g/mol, more preferably 200 to 800 g/mol and most preferably 200 to 500 g/mol.

Preferably the C=C bond concentration of component (c) is in the range of from 4 to 8 mmol/g and more preferably 5 to 7 mmol/g of (c).

Any photoinitiator and mixtures thereof capable of generating free radicals when exposed to radiation may be used. Preferred photoinitiators include Irgacure™ 184; acyl phosphine oxides, for example Irgacure™ 819; or benziketals such as Irgacure™ 651, available from BASF, and Darocur™ 1173 or Darocur™ BP (a benzophenone) available from BASF. The composition of the invention may additionally comprise 0.01 to 10 wt %, more preferably 1 to 8 wt %, most preferably 3 to 5 wt % of photoinitiator by weight of the total composition.

Standard matting agents include for example silica (for example amorphous silicon dioxide), diatomaceous earth, heavy metal soaps, talcum, chalk and waxes. Preferably the matting agent is selected from the group consisting of silica, diatomaceous earth, heavy metal soaps, talcum, chalk and mixtures thereof.

Examples of matting agents include Acematt™ 3300 (a pyrogenic silica), Acematt™ TS-100, Acematt™ HK-400, Aerosil™ R-7200 and Aerosil™ R-9200 available from Evonik Degussa; Syloid™ ED5 available from W.R. Grace & Co; Gasil™ ED-5, Gasil™ 23D, Gasil™ 23F, Gasil™ 35M, Gasil™ HP-230, Gasil™ HP-270 and Gasil™ HP-880 from PQ Corporation and Deuteron MK (Methylenediaminomethylether-polycondensate) from Deuteron. Ceraflour™ 988 from BYK is an example of a micronized amide modified polyethylene wax matting agent. The type of matting agent can also be chosen to suit the final application. For instance when Gasil™ 23D is used a matt film is obtained with high transparency, but when Gasil™ UV-70C or Acematt™ 3300 are used matt films are obtained with low transparency.

Preferably the composition of the invention comprises 0.1 to 13 wt %, more preferably 0.1 to 10 wt %, especially 1 to 8 wt % and most especially 3 to 8 wt % of matting agent by weight of the coating composition.

The composition of the invention may contain other conventional ingredients including coalescing organic solvents, pigments, dyes, heat stabilisers, defoamers, levelling agents, anti-cratering agents, fillers, sedimentation inhibitors, UV absorbers, antioxidants and the like introduced at any stage of the preparation process or subsequently. It is possible for example to include an amount of antimony oxide in the dispersions to enhance the fire retardant properties. It may also be advantageous to add beads (solid acrylic thermoplastic polymers) to the composition so as to reduce shrinkage and improve adhesion of the resultant coating.

The composition of the invention is liquid and preferably has a viscosity ≤1000 mPa·s, more preferably ≤800 mPa·s.

The coating composition of the invention is particularly useful as a coating composition or for providing the principle component of coating compositions (e.g. protective or decorative coating compositions) for which purpose they may be further diluted with volatile organic solvents.

The volatile organic solvent can be an aliphatic or an aromatic hydrocarbon such as Solvesso™ 100(R), a mixture of aromatic solvents having an aromatic solvent content of 99.5% by weight and comprising primarily C9-10 dialkyl and trialkyl benzenes. Also suitable are toluene or xylene, alcohols such as n-butanol or isopropanol, esters such as iso-butyl acetate, n-butyl acetate, n-propyl acetate, methyl acetate or ethyl acetate, ketones such as acetone, methyl isobutyl ketone or methyl ethyl ketone, ethers, ether-alcohols or ether-esters such as ethyl 3-ethoxypropionate, propylene glycol methyl ether, propylene glycol ethyl ether, propylene glycol n-propyl ether or propylene glycol t-butyl ether or a mixture of any of these. The level and type of solvent used will depend on the viscosity of the other components and the intended application method.

In an embodiment of the invention the composition contains <5 wt %, more preferably ≤2 wt %, most preferably ≤0.1 wt % and especially 0 wt % of added volatile organic solvent. This excludes minute amounts of solvents that may be present as result of incorporating additives into the composition. This is advantageous as a higher level of solvent may result in an increase in gloss.

In another embodiment of the present invention there is provided a process for preparing the coating composition of the invention comprising the following steps:
i) combining components (a) to (c);
ii) adding a matting agent;
iii) optionally adding additive and or solvent;
where steps i), ii) and iii) may be in any order.

Before application to a substrate a photoinitiator may be added.

Coating compositions of the invention may be applied to a variety of substrates including wood, board, metal, stone, concrete, glass, cloth, leather, paper, plastics, foam and the like, by conventional methods including brushing, dipping, flow coating, spraying, roller, and the like. They are, however, particularly useful for providing coatings on wood, paper, plastic and board substrates.

There is further provided according to the present invention a coating obtained from a composition according to the present invention.

There is also provided a coated substrate having a coating comprising an coating composition according to the present invention; and a use of a coating composition according to the invention, for coating a substrate comprising steps of application of the coating composition to the substrate to form a coating followed by radiation curing the coating to give a matt coating having a gloss measurement of ≤15 at 60° and ≤80 at 85° at a cured film thickness of 12 μm measured using BYK Gardner micro-TRI-gloss 20-60-85 glossmeter in accordance with DIN-67530.

There is also provided a matt coating prepared by coating a substrate with a composition according to any one of the preceding claims, said matt coating having a gloss measurement of ≤15 at 60° and ≤80 at 85° at a cured film thickness of 12 μm measured using BYK Gardner micro-TRI-gloss 20-60-85 glossmeter in accordance with DIN-67530.

The present invention is now illustrated by reference to the following example. Unless otherwise specified, all parts, percentages and ratios are on a weight basis.

Materials and Abbreviations Used:
Component (a)
NeoRad™ P-30=polyester acrylate, functionality=4, available from DSM NeoResins BV, contains 20-35% of GPTA
NeoRad™ P-80=amine modified polyether acrylate, functionality=4, available from DSM NeoResins BV, contains 32% TMP3EOTA
Component (b)
LA=lauryl acrylate
2-EHA=2-ethylhexyl acrylate
ODA=octyldecyl acrylate
iDA=isodecyl acrylate
iBOA=isobornyl acrylate
Component (c)
GPTA=glycerol propoxylate triacrylate
TMPTA3EO=ethoxylated trimethylolpropane tri(meth)acrylate
HDDA=1,6-hexane diol diacrylate
DPGDA=dipropylene glycol diacrylate
CTFA=cyclic trimethylolpropane formal acrylate
Matting Agents
Gasil™ UV-70C=silica matting agent APS=7.5; wax surface treatment; oil absorption 250 g/100 g
Gasil™ 23D=silica matting agent APS=4.4; no surface treatment; oil absorption 290 g/100 g
Syloid™ RAD 2005=silica matting agent APS=4.8-5.8; 20% organic surface treatment
Acematt™ 3300=silica matting agent APS=10; 20% no surface treatment; oil absorption 290 g/100 g, d50=10
Acematt™ 3600=silica matting agent APS=6; 20% no surface treatment; d50=6
Ceraflour™ 988=Micronized amide modified polyethylene wax
Deuteron™ MK=Methylenediaminomethylether-polycondensate
Others:
Darocur™ 1173=photoinitiator
Dxx=y=means xx % of the particles have a particle size smaller than y μm)
APS=average particle size (μm)
UV Curing:
Examples that were UV cured were cured in the following way:
Coating layer thickness: before curing: 12 μm on Leneta opacity card
Coating layer thickness: after curing: 12 μm on Leneta opacity card [generally no substantial shrinkage (<3%)]
UV curing: 1000 to 1500 mJ/cm$^3$, 240 nm/80 Watt (no flash off needed)
Photoinitiator: See tables below for details
Gloss Measurements
BYK Gardner micro-TRI-gloss 20-60-85 glossmeter in accordance with DIN-67530.
Resistance to MEK or Ethanol
MEK (methyl ethyl ketone) or ethanol rub tests (being a measure of the resistance of the coating to the solvent) were performed on the coated glass plates using cotton wool soaked with the solvent which was rubbed over the surface of the coating. 200 DR is the number of double rubs, 1=coating failed, 5=coating fully intact.
Viscosity Measurement
Viscosity was determined using a Brookfield DV-II+ Viscometer, spindle #4 at 23° C. and 60 rotations per minute.

EXAMPLES

The following examples were prepared and coatings were obtained and tested. The compositions of the examples and results are as shown in the tables below.

Examples 1-7

Compositions of the invention (with component (b)) and comparative compositions (C) (without component (b)) using a range of additional matting agents were prepared as described and their gloss results are shown in Table 1 below.

TABLE 1

| Ingredient (parts) | (C) 1 | (C) 2 | 3 | 4 | 5 | 6 | 7 |
|---|---|---|---|---|---|---|---|
| NeoRad ™ P-30 | 80 | 80 | 20 | 41 | 47.5 | 41 | 41 |
| Gasil UV-70C | 13 | — | 13 | — | — | — | — |

TABLE 1-continued

| Ingredient (parts) | (C) 1 | (C) 2 | 3 | 4 | 5 | 6 | 7 |
|---|---|---|---|---|---|---|---|
| Syloid RAD 2005 | — | 13 | — | — | — | — | — |
| Gasil 23D | — | — | — | 13 | — | — | — |
| Acematt 3300 | — | — | — | — | 6.5 | — | — |
| Ceraflour 988 | — | — | — | — | — | 13 | — |
| Deuteron MK | — | — | — | — | — | — | 13 |
| DPGDA | 1 | 1 | 21 | — | — | — | — |
| Darocur 1173 | 6 | 6 | 6 | 6 | 6 | 6 | 6 |
| LA | — | — | 40 | 40 | 40 | 40 | 40 |
| | | | | | | | |
| Total | 100 | 100 | 100 | 100 | 100 | 100 | 100 |
| Gloss (12 μm) 60° | 31 | 57 | 0.8 | 0.3 | 0.7 | 2.6 | 2.0 |
| Gloss (12 μm) 85° | 88 | 97 | 12 | 34 | 23 | 9.1 | 17 |

Examples 8 & 9

Compositions of the invention and their gloss results and MEK/ethanol resistances are described below in Table 2.

TABLE 2

| Ingredient (parts) | 8 | 9 |
|---|---|---|
| NeoRad ™ P-30 | 47.5 | — |
| NeoRad ™ P-80 | — | 47.5 |
| LA | 40 | 40 |
| Acematt 3300 | 6.5 | 6.5 |
| Darocur 1173 | 6 | 6 |
| total | 100 | 100 |
| Viscosity 25° C. (mPa · s) | 670 | 400 |
| Gloss (12 μm) 60°/85° | 0.8/20 | 2.2/30 |
| MEK (200 DR) | 4-5 | 5 |
| Ethanol (200 DR) | 4-5 | 5 |

Examples 10-15

Compositions of the invention (with varying amounts of component (b) and comparative compositions (C) (<10 wt % of component (b) by weight of components (a)+(b)+(c)) are described below in Table 3.

TABLE 3

| Ingredient (parts) | 10 | 11 | 12 | 13 | (C) 14 | (C) 15 |
|---|---|---|---|---|---|---|
| NeoRad ™ P-30 | 21 | 41 | 61 | 71 | 76 | 81 |
| LA | 60 | 40 | 20 | 10 | 5 | 0 |
| Gasil UV-70C | 13 | 13 | 13 | 13 | 13 | 13 |
| Darocur 1173 | 6 | 6 | 6 | 6 | 6 | 6 |
| Total | 100 | 100 | 100 | 100 | 100 | 100 |
| Gloss (12 μm) 60° | 0.4* | 0.3 | 5 | 9 | 42 | 73 |
| Gloss (12 μm) 85° | 9* | 34 | 45 | 58 | 66 | 87 |

Note:
*cured film is still sticky/wet and thus not properly cured although matting still measurable Examples 16-22

Compositions of the invention (different components (b) at 11.6% based on components (a)+(b)+(c)) and comparative compositions (C) (based on components (a)+(c)) are described below in Table 4.

TABLE 4

| Ingredient (parts) | 16 | 17 | 18 | 19 | 20 | (C) 21 | (C) 22 |
|---|---|---|---|---|---|---|---|
| NeoRad ™ P-30 | 54 | 54 | 54 | 54 | 54 | 54 | 54 |
| LA | 10 | — | — | — | — | — | — |
| 2-EHA | — | 10 | — | — | — | — | — |
| ODA | — | — | 10 | — | — | — | — |
| iDA | — | — | — | 10 | — | — | — |
| iBOA | — | — | — | — | 10 | — | — |
| CTFA | — | — | — | — | — | 10 | — |
| DPGDA | 22 | 22 | 22 | 22 | 22 | 22 | 32 |
| Acematt 3600 | 2 | 2 | 2 | 2 | 2 | 2 | 2 |
| Acematt 3300 | 6 | 6 | 6 | 6 | 6 | 6 | 6 |
| Darocur 1173 | 6 | 6 | 6 | 6 | 6 | 6 | 6 |
| Total | 100 | 100 | 100 | 100 | 100 | 100 | 100 |
| Gloss (12 μm) 60° | 10 | 8 | 9 | 14 | 15 | 27 | 35 |
| Gloss (12 μm) 85° | 69 | 66 | 68 | 75 | 80 | 84 | 84 |

The invention claimed is:

1. A radiation curable liquid coating composition comprising:
   (a) 10 to 66 wt % of at least one multifunctional (meth)acrylated oligomer selected from the group consisting of polyester (meth)acrylate, urethane (meth)acrylate, epoxy (meth)acrylate, polyether (meth)acrylates, amine modified polyether(meth)acrylates, acrylic (meth)acrylates and mixtures thereof;
   (b) 10 to 60 wt % of at least one $C_8$ to $C_{20}$ monofunctional aliphatic alkyl (meth)acrylate;
   (c) 5 to 40 wt % of at least one monomeric reactive diluent not comprising (a) or (b);
   wherein (a)+(b)+(c)=100%;
   the coating composition additionally comprising 0.1 to 15 wt % of matting agent by weight of the coating composition.

2. A coating composition according to claim 1 wherein the coating composition is UV radiation curable.

3. A coating composition according to claim 1 additionally comprising <5 wt % of solvent.

4. A coating composition according to claim 1 wherein the composition has a viscosity ≤1000 mPa·s.

5. A coating composition according to claim 1 wherein the (meth)acrylated oligomer (a) has a Mn≥300 g/mol.

6. A coating composition according to claim 1 wherein the (meth)acrylated oligomer (a) is present in an amount from 5 to 80% by weight of (a)+(b)+(c).

7. A coating composition according to claim 1 wherein the alkyl (meth)acrylated material (b) is branched or linear.

8. A coating composition according to claim 1 wherein the alkyl (meth)acrylated material (b) has a Mn≤450 g/mol.

9. A coating composition according to claim 1 wherein the alkyl (meth)acrylated material (b) is selected from the group consisting of octyl (meth)acrylate, decyl (meth)acrylate, lauryl (meth)acrylate, stearyl (meth)acrylate and mixtures thereof.

10. A coating composition according to claim 1 wherein the alkyl (meth)acrylated material (b) is present in an amount from 15 to 70% by weight of (a)+(b)+(c).

11. A coating composition according to claim 1 wherein the reactive diluent (c) is selected from the group consisting of trimethylolpropane tri(meth)acrylate (TMPTA), pentaerythritol acrylate (PETA), 1,6-hexane diol diacrylate (HDDA), neopentyl glycol di(meth)acrylate (NPGDA), glycerol propoxylate triacrylate (GPTA), ethoxylated trimethylolpropane tri(meth)acrylate (TMPTA3EO, TMPTA6EO), and mixtures thereof.

12. A coating composition according to claim 1 wherein the reactive diluent (c) is present in an amount from 1 to 40% by weight of (a)+(b)+(c).

13. A coating composition according to claim 1 wherein the matting agent is selected from the group consisting of silica, diatomaceous earth, heavy metal soaps, talcum, chalk and mixtures thereof.

14. A coated substrate comprising:
a substrate which is at least one selected from the group consisting of wood, board, metal, stone, concrete, cloth, leather, paper, plastic or foam, and
a matt coating on the substrate, wherein the matt coating is comprised of a radiation curable liquid coating composition comprised of:

(a) 10 to 66 wt % of at least one multifunctional (meth)acrylated oligomer selected from the group consisting of polyester (meth)acrylate, urethane (meth)acrylate, epoxy (meth)acrylate, polyether (meth)acrylates, amine modified polyether(meth) acrylates, acrylic (meth)acrylates and mixtures thereof;
(b) 10 to 60 wt % of at least one $C_8$ to $C_{20}$ monofunctional aliphatic alkyl (meth)acrylate;
(c) 5 to 40 wt % of at least one monomeric reactive diluent not comprising (a) or (b);
wherein (a)+(b)+(c)=100%; and wherein
the coating composition additionally comprises 0.1 to 15 wt % of a matting agent by weight of the coating composition.

15. The coated substrate according to claim 14, wherein the matt coating has a gloss measurement of ≤15 at 60° and ≤80 at 85° at a cured film thickness of 12 μm measured using BYK Gardner micro-TRI-gloss 20-60-85 glossmeter in accordance with DIN-67530.

16. A method of coating a substrate comprising the steps of:
(a) applying the coating composition according to claim 1 onto a surface of the substrate to form a coating, followed by
(b) radiation curing the coating to yield a matt coating having a gloss measurement of ≤15 at 60° and ≤80 at 85° at a cured film thickness of 12 μm measured using BYK Gardner micro-TRI-gloss 20-60-85 glossmeter in accordance with DIN-67530.

* * * * *